(12) United States Patent
Whiteside et al.

(10) Patent No.: US 10,884,416 B2
(45) Date of Patent: Jan. 5, 2021

(54) FOOT PEDAL DEVICE FOR CONTROLLING A TROLLING MOTOR

(71) Applicant: Garmin Switzerland GmbH, Schaffhausen (CH)

(72) Inventors: John B. Whiteside, Lenexa, KS (US); Robert M. Kalis, Overland Park, KS (US); Albert F. Miller, Gardner, KS (US)

(73) Assignee: Garmin Switzerland GmbH

( * ) Notice: Subject to any disclaimer, the term of this patent is extended or adjusted under 35 U.S.C. 154(b) by 346 days.

(21) Appl. No.: 15/897,952

(22) Filed: Feb. 15, 2018

(65) Prior Publication Data

US 2019/0176950 A1 Jun. 13, 2019

Related U.S. Application Data

(60) Provisional application No. 62/596,994, filed on Dec. 11, 2017.

(51) Int. Cl.
*G05D 1/02* (2020.01)
*B63H 20/12* (2006.01)
*B63H 20/14* (2006.01)
*B63H 25/42* (2006.01)
(Continued)

(52) U.S. Cl.
CPC ......... *G05D 1/0206* (2013.01); *B63H 20/007* (2013.01); *B63H 20/12* (2013.01); *B63H 20/14* (2013.01); *B63H 25/42* (2013.01); *B63H 2020/003* (2013.01); *B63H 2025/465* (2013.01)

(58) Field of Classification Search
CPC ............ B63H 2020/003; B63H 20/007; B63H 20/12; B63H 20/14; B63H 2021/213; B63H 2021/216; B63H 25/42; B63H 2025/465; G05D 1/0206; G05D 1/0208
See application file for complete search history.

(56) References Cited

U.S. PATENT DOCUMENTS 3,807,345 A * 4/1974 Peterson ................ B63H 21/22
440/7
5,362,263 A 11/1994 Petty
(Continued)

OTHER PUBLICATIONS

Printout from http://www.cabelas.com/product/MOTORGUIDE-XI-W-PINPOINT-GPS-BOW-MOUNT/1701905.uts?slotId=0 published prior to Feb. 15, 2018.
(Continued)

*Primary Examiner* — Ajay Vasudeva
(74) *Attorney, Agent, or Firm* — Samuel M. Korte; Max M. Ali

(57) ABSTRACT

A foot pedal device for controlling an electric steer trolling motor and navigating a marine vessel. The foot pedal allows proportional control of the vessel such that the operator's foot movement on the foot pedal is proportional to an action by the trolling motor. The foot pedal includes a platform that pivots upon a base, an angular position monitor, and a controller; the controller is communicatively coupled to the angular position monitor and is configured to receive an angular measurement from the magnetic angle sensor and generate at least one control signal for a trolling motor of a marine vessel at least partially based on the angular measurement from the sensor.

16 Claims, 12 Drawing Sheets

(51) Int. Cl.
*B63H 25/46* (2006.01)
*B63H 20/00* (2006.01)

(56) References Cited

U.S. PATENT DOCUMENTS

| | | | | |
|---|---|---|---|---|
| 5,618,212 | A * | 4/1997 | Moore | H01H 3/14 |
| | | | | 200/303 |
| 5,892,338 | A * | 4/1999 | Moore | B63H 20/007 |
| | | | | 318/16 |
| 6,126,497 | A * | 10/2000 | Stockton | B63H 20/007 |
| | | | | 114/144 A |
| 6,431,923 | B1 * | 8/2002 | Knight | B63H 20/007 |
| | | | | 440/6 |
| 6,468,117 | B1 * | 10/2002 | Healey | B63H 21/213 |
| | | | | 114/144 E |
| 7,538,511 | B2 | 5/2009 | Samek | |
| 7,882,791 | B2 * | 2/2011 | Huntt | B63H 25/42 |
| | | | | 114/144 R |
| 8,761,976 | B2 * | 6/2014 | Salmon | B63H 21/21 |
| | | | | 440/6 |
| 8,991,280 | B2 * | 3/2015 | Wireman | B63H 25/10 |
| | | | | 74/496 |
| 9,195,234 | B2 | 11/2015 | Stephens | |
| 9,290,256 | B1 * | 3/2016 | Wireman | B63H 20/12 |
| 9,440,724 | B2 | 9/2016 | Suzuki et al. | |
| 9,676,462 | B2 * | 6/2017 | Bernloehr | B63H 25/02 |
| 9,988,134 | B1 | 6/2018 | Gable et al. | |
| 10,281,576 | B2 | 5/2019 | DePasqua | |
| 10,336,425 | B2 * | 7/2019 | Laster | B63H 20/007 |
| 10,513,322 | B2 * | 12/2019 | Clark | B63H 21/21 |
| 2005/0263058 | A1 | 12/2005 | Suemori et al. | |
| 2006/0116796 | A1 | 6/2006 | Fossen et al. | |
| 2007/0073454 | A1 | 3/2007 | Kaji et al. | |
| 2007/0089660 | A1 | 4/2007 | Bradley et al. | |
| 2007/0162207 | A1 | 7/2007 | Shimo et al. | |
| 2007/0178779 | A1 | 8/2007 | Takada et al. | |
| 2009/0037040 | A1 | 2/2009 | Salmon et al. | |
| 2009/0171520 | A1 | 7/2009 | Kaji | |
| 2010/0023192 | A1 | 1/2010 | Rae et al. | |
| 2010/0138083 | A1 | 6/2010 | Kaji | |
| 2010/0145558 | A1 | 6/2010 | Kaji | |
| 2011/0153126 | A1 | 6/2011 | Arbuckle et al. | |
| 2011/0166724 | A1 | 7/2011 | Hiramatsu | |
| 2011/0172858 | A1 | 7/2011 | Gustin et al. | |
| 2012/0072059 | A1 | 3/2012 | Glaeser | |
| 2012/0129410 | A1 | 5/2012 | Tyers | |
| 2012/0232719 | A1 | 9/2012 | Salmon et al. | |
| 2015/0089427 | A1 | 3/2015 | Akuzawa | |
| 2015/0346730 | A1 | 12/2015 | Stephens et al. | |
| 2016/0016651 | A1 | 1/2016 | Anderson et al. | |
| 2016/0101838 | A1 | 4/2016 | Kojima | |
| 2016/0246300 | A1 | 8/2016 | Langford-Wood | |
| 2016/0252907 | A1 | 9/2016 | Parkinson | |
| 2016/0334792 | A1 | 11/2016 | Jopling | |
| 2017/0205828 | A1 | 7/2017 | Estabrook | |
| 2017/0205829 | A1 | 7/2017 | Tyers | |
| 2017/0210449 | A1 | 7/2017 | Frisbie et al. | |
| 2017/0253314 | A1 | 9/2017 | Ward | |
| 2017/0255200 | A1 | 9/2017 | Arbuckle et al. | |
| 2017/0277189 | A1 | 9/2017 | Johnson et al. | |
| 2017/0349257 | A1 | 12/2017 | Hara et al. | |
| 2017/0365175 | A1 | 12/2017 | Harnett | |
| 2018/0015994 | A1 | 1/2018 | Kishimoto et al. | |
| 2018/0057132 | A1 | 3/2018 | Ward et al. | |
| 2019/0155288 | A1 | 5/2019 | Arbuckle et al. | |
| 2019/0176950 | A1 | 6/2019 | Whiteside et al. | |
| 2019/0179318 | A1 | 6/2019 | Miller et al. | |
| 2019/0204837 | A1 | 7/2019 | Estabrook | |
| 2019/0361457 | A1 | 11/2019 | Johnson et al. | |

OTHER PUBLICATIONS

Printout from https://www.cabelas.com/product/MINN-KOTA-ULTREX-COMBO-US-IP-BT/2403120.uts?slotId=0 published prior to Feb. 15, 2018.

\* cited by examiner

FOOT PEDAL DEVICE FOR CONTROLLING A TROLLING MOTOR

RELATED APPLICATION

The present application claims the benefit under 35 U.S.C. § 119(e) of U.S. Provisional Application Ser. No. 62/596,994, filed Dec. 11, 2017, and entitled "FOOT PEDAL DEVICE FOR CONTROLLING A TROLLING MOTOR," which is herein incorporated by reference in its entirety.

BACKGROUND

Marine vessels such as sport fishing boats or bass boats used by sport fishermen typically employ a primary motor (e.g., a propulsion motor) that propels the marine vessel through the water and one or more trolling motors that can be used instead of or in addition to the propulsion motor in certain situations. For example, a trolling motor may be used instead of the propulsion motor when navigating the marine vessel through environments that require precise control of the vessel's position (e.g., navigating around obstacles and/or in shallow water). Similarly, a sport fisherman may use the trolling motor to maintain the position of the marine vessel while fishing in situations where currents or wind may tend to cause the vessel to drift while the propulsion motor is idle.

Trolling motors are normally mounted to either or both the bow of the marine vessel or the transom of the marine vessel adjacent to the propulsion motor. Typically, trolling motors include a drive motor and propeller that can be lifted out of the water to reduce drag while the propulsion motor is in use. Trolling motors can be controlled manually using controls that are located directly on the motor, but it is often useful for a trolling motor to be controlled by a foot pedal, leaving the operator's hands free for performing other tasks, such as fishing.

SUMMARY

A foot pedal device for controlling an electric steer trolling motor suitable for use by a marine vessel such as a sport fishing boat or bass boat is disclosed. The foot pedal device allows proportional control of the trolling motor such that a movement of the operator's foot on the foot pedal device is proportional to an action by the trolling motor. For example, the foot pedal device allows proportional steering of the trolling motor so that an action by the operator on the foot pedal device results in a defined angle of rotation of the trolling motor. In many cases, depending on current and wind conditions, for example, this results in a defined angle of turning by the marine vessel. In addition, the foot pedal device offers tactile feedback to the operator so that the operator may have a better sense of control over movement of the vessel.

In example embodiments, the foot pedal device can include a foot platform that pivots upon a base, an angular position monitor that detects pivotal movement of the foot pedal platform, and a controller. The controller can be communicatively coupled to the angular position monitor and configured to receive an angular measurement from the angular position monitor (i.e., a user input) and generate at least one control signal for an electric steer control of a trolling motor mounted to the marine vessel. The control signal is at least partially based on the user input from the angular position monitor. The control signal communicated to the electric steer control is translated into an action by the trolling motor such as a defined speed or direction of rotation of the trolling motor. The angular measurement (user input) can have a defined ratio to the angle of rotation of the motor or the speed of the motor. In an embodiment, the angular position monitor is comprised of a magnet coupled to the pivotal movement of the foot platform and a magnetic angle sensor. In an embodiment, the foot pedal device further can provide tactile feedback such that pivotal movement of the platform in response to the operator's foot pressure on the platform is resisted. Therefore, the operator senses greater control over pivotal movement of the platform and operation of the vessel.

A method for navigating a marine vessel with a foot pedal device is also disclosed. The method includes receiving a user input from the foot pedal device, such as an angular measurement of the foot pedal platform. At least one control signal for a motor of the marine vessel is generated at least partially based on the user input and transmitted to the motor. In implementations, at least one operational parameter (e.g., heading, direction of rotation, speed, or any combination thereof) of the motor is adjusted based on the control signal.

A system for navigating a marine vessel is also disclosed. The system includes a trolling motor and a foot pedal in communication with the trolling motor. The foot pedal includes a pivoting foot platform, an angular position monitor that detects the pivotal movement of the foot platform, and a controller. The controller is communicatively coupled to the angular position monitor and is configured to receive an angular measurement from the monitor (user input) and configured to generate at least one control signal for an electric steer control of a trolling motor of the marine vessel. The control signal is at least partially based on the user input.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
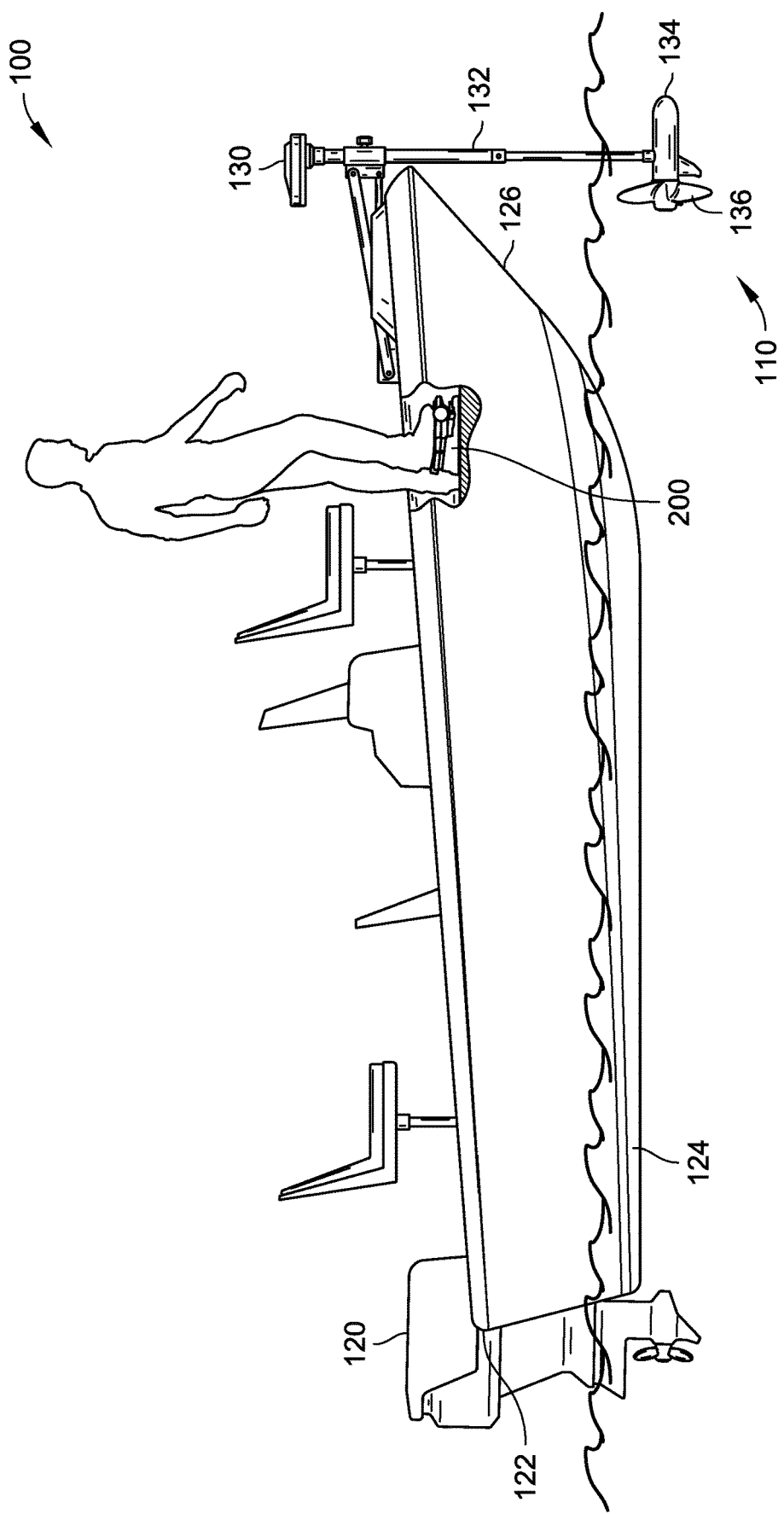
FIG. 1 is a view of a marine vessel that can employ a foot pedal device for controlling a motor, such as a trolling motor, mounted on a bow of the marine vessel, in accordance with an example embodiment of the present disclosure. The foot pedal device is shown in a cutaway section of the vessel.

Trolling motors can be controlled using a variety of techniques. For example, an operator can manually control a trolling motor using controls attached directly to a steering handle mounted to the motor pod of the trolling motor via a shaft. A trolling motor can also be controlled by a chart plotter or autopilot configured to set and control the position and/or course of the marine vessel. A trolling motor can be controlled by a hand operated remote control. However, in many implementations, it is advantageous to operate a trolling motor using a foot pedal, such as on a sport fishing boat or bass boat where the operator, a sport fisherman or angler, wishes to have his hands free for fishing.

Foot pedal controllers for trolling motors are of two general types, cable steer or electric steer. Cable steer devices for controlling trolling motors are physically connected to the trolling motor with mechanical push/pull cables. The operator moves the foot pedal with his foot and the attached cables mechanically rotate the trolling motor. However, such cables are cumbersome, and provide limited movement of the trolling motor. Moreover, the trolling motor can only rotate as far as the length of the cables allow. Also, cables can get caught on structures located on the vessel. Additionally, cables make it more difficult to move the foot pedal device around on the vessel, for example if the operator wishes to move to stand on another side of the marine vessel to fish.

Electric steer motors are controlled wirelessly or are coupled via an electrical cable or wire to a controller, which may be a foot pedal device. Electric steer trolling motors offer some advantages over cable steer but also have their drawbacks. For example, electric steer foot pedal controllers do not offer the same "touch and feel" of cable steer. Thus, the operator does not have the same sense of control over operation of the trolling motor.

A foot pedal device for controlling an electric steer trolling motor is disclosed. The foot pedal device allows proportional control of the trolling motor such that the movement of the operator's foot on the foot pedal device is proportional to an action by the trolling motor. For example, the foot pedal device offers proportional steering; each action by the operator on the foot pedal device results in a defined action, such as angle of rotation, of the trolling motor. The foot pedal device may be cable-less. In addition, the foot pedal device offers tactile feedback to the operator so that the operator may have a better sense of control over actions of the trolling motor and movement of the vessel.

"Proportional control" or "proportional steering" as used herein means that each input to the foot pedal device has a defined action on the trolling motor. In an implementation, pivotal movement of a foot platform of the foot pedal device results in a specific movement of the trolling motor, such as rotation of the trolling motor. For example, the degree of rotation of the trolling motor is proportional to the degree of pivotal movement of the platform of the foot pedal.

"Tactile feedback" as used herein means signals provided through the foot pedal device to the operator of the device (e.g., a sport fisherman or angler, an operator of the marine vessel, and so forth).

In embodiments, the foot pedal device includes a foot platform that pivots upon a base, an angular position monitor, and a controller. The angular position monitor measures the degree of pivot of the platform upon the base and can include a magnet coupled to the pivotal movement of the foot platform and a magnetic angle sensor. The controller is communicatively coupled to the angular position monitor. The controller is configured to receive an angular measurement from the magnetic angle sensor (user input) and generate at least one control signal for an electric steer control of a trolling motor of a marine vessel at least partially based on the angular measurement from the sensor.

FIGS. 1 through 5 illustrate implementations of a marine vessel 100 and a foot pedal device 200 for controlling a trolling motor 110 of the vessel 100. Marine vessel 100 may be a salt water or fresh water marine vessel, used for recreation, fishing, motorsports, transportation, etc. Most desirably, marine vessel 100 may be a marine vessel useful for fishing, such as sport fishing or bass fishing. As shown in FIG. 1, the marine vessel 100 can have at least one propulsion motor 120 that is a primary source of propulsion for navigating the marine vessel 100 through the water. In an embodiment, the propulsion motor 120 can be mounted to a rear portion (e.g., stern 122 and/or transom 124) of the marine vessel 100.

The trolling motor 110 is also shown in FIG. 1, mounted to a front portion (e.g., bow 126) of the marine vessel 100. The trolling motor 110 can be operable in parallel with the propulsion motor 120 to enhance steering capabilities of the marine vessel 100. In other situations, the trolling motor 110 may be operable instead of the propulsion motor 120 to navigate the marine vessel 100 at slower speeds and/or with greater precision (e.g., when navigating around obstacles, in shallow water, or the like). In some situations, the trolling motor 110 may be employed to navigate the marine vessel 100 instead of the propulsion motor 120, for example to reduce turbulence resulting from the marine vessel 100 as it is navigated through the water. For example, reduced turbulence may be desirable to avoid scaring away fish or to avoid damage to aquatic environments. In some situations, the trolling motor 110 may be employed to hold or anchor the vessel 100 in a fixed location. For example, the trolling motor 110 may be used to hold the vessel 100 in position against a current or wind while the operator is fishing in a specific location. Or, the trolling motor 110 may be employed to turn the vessel 100 in place so that an angler has a better angle to cast a fishing line to a desired location.

While a single front-mounted trolling motor 110 is shown in FIG. 1, the trolling motor 110 can be mounted to other portions of the marine vessel 100 (e.g., affixed to other portions of the marine vessel's hull). In an embodiment, the trolling motor 110 can be mounted to a rear portion (e.g., stern 122 and/or transom 124) of the vessel. In other embodiments, more than one trolling motor can be mounted to the rear and/or front of the vessel 100.

The trolling motor 110 includes an electric steer control 130 which can be one which is known in the art and includes known mechanisms to enable it to direct the rotation of the support column 132, drive motor 134, and propeller 136 of the trolling motor 110, and thus the direction and the speed of the vessel 100. The electric steer control 130 can be wireless or wired to the foot pedal device 200.

FIGS. 2 through 5 illustrate an embodiment of a foot pedal device 200 in greater detail. The foot pedal device 200 is configured to generate at least one control signal for the electric steer control 130 of trolling motor 110 based on user input comprised of the pivotal movement of the platform 220. In one embodiment, the control signal directs the electric steer control 130 to rotate the support column 132, drive motor 134 and propeller 136 of the trolling motor 110 either clockwise or counterclockwise, thereby turning the marine vessel 100 to the right or left, respectively.

The foot pedal device 200 includes a base member 210 and a platform 220 that pivots around an axis of the base member 210. Axial rotation can be can be enabled by a first pivot shaft 270 fixed to the base 210 and a second pivot shaft 272 which can be fixed to the base member 210 or to the platform 220 (best illustrated in FIG. 3). The platform 220 can have a heel portion 222 and a toe portion 224, indicating a placement of the operator's foot on the platform 220. In the embodiment shown in FIGS. 2 through 5 the axis or pivot point of the platform 220 is approximately at the midpoint of the platform 220 or the operator's foot.

The foot pedal device 200 includes one or more angular position monitors for detecting the pivotal movement of the platform 220. For example, as shown best in FIG. 3, in an embodiment, the foot pedal 200 includes a magnetic field sensor 230 fixed to the base 210. A magnet 240 is fixed to and pivots with the platform 220. A controller 260 (not shown in FIG. 3) is communicatively coupled to the magnetic field sensor 230. The controller 260 is configured to receive a measurement from the magnetic field sensor 230 corresponding to the movement of the magnet 240 and thus pivotal movement of the platform 220 and generate at least one control signal to the electric steer control 130 of the trolling motor 110.

Following convention, in an embodiment, the controller 260 is programmed so that when the platform 220 is pivoted downwards towards the heel portion 222 the controller 260 directs the electric steer control 130 to rotate the drive motor 134 and propeller 136 of the trolling motor 110 counterclockwise, thereby turning the marine vessel 100 to the left. When the platform 220 is pivoted towards the toe portion 224 the controller 260 directs the electric steer control 130 to rotate the drive motor 134 and propeller 136 of the trolling motor 110 clockwise and turn the vessel 100 right. Note that in some cases, the boat may not actually change direction, such as if the current or wind is pushing the boat in a direction and the trolling motor 200 is being used to correct for the current or wind and maintain a direction of the vessel 100.

In other embodiments, the platform 220 can pivot side to side and the controller 260 can be configured so that pivotal movement of the platform 220 to one side causes rotation of the drive motor 134 and propeller 136 of the trolling motor 110 clockwise and pivotal movement of the platform 220 to the other side causes rotation of the drive motor 134 and propeller 136 of the trolling motor 110 counterclockwise. In another embodiment, the controller 260 can be programmed so that pivoting the platform 220 downwards towards the heel portion 222 can cause rotation of the drive motor 134 and propeller 136 of the trolling motor 110 clockwise and pivoting the platform 220 towards the toe portion 224 can cause rotation of the drive motor 134 and propeller 136 of the trolling motor 110 counterclockwise.

The magnet 240 can be a diametrically polarized magnet and can be fixedly attached to a first pivot shaft 270 which is in turn fixedly connected to the platform 220. A magnetic field sensor 230 can be fixedly attached to the base 210 at the pivot axis across from the magnet 240.

The controller 260 can be programmed to provide proportional control, where a defined movement of the magnet 240 (and the platform 220) is communicated by the controller 260 to the electric steer motor 130 of the trolling motor 110 and results in a defined and proportional action by the trolling motor 110. For example, the action can be a defined degree and direction of rotation of the trolling motor 200 and turning by the vessel 100. Controller 260 can be programmed so that movement of the platform 220 has a constant ratio to an action by the trolling motor 110. In an embodiment, this action is turning of the boat by the trolling motor 110. In an embodiment, the movement of the platform 220 is pivoting of the platform 220. In other embodiments, the movement of the platform 220 can be different, and/or the action can be different.

In an embodiment, each angle of pivot by the platform 220 results in a specified direction and degree of rotation by the drive motor 134 and the propeller 136. The ratio of the platform 220 angle to drive motor 134 and propeller 136 rotation can be changed by programming the controller 260. Controller 260 can be programmed for linear proportionality or exponential proportionality.

Other ways of detecting movement of the platform 220 and using a controller 260 to direct the electric steer motor 130 can be used. For example, a potentiometer can be used.

The foot pedal device 200 may offer tactile feedback to the operator of the foot pedal device 200. Tactile feedback provides a response to the movement of the platform 220 by the operator's foot. This response is desirably resistance of pivotal movement of the platform 220 in response to the operator's toe or heel foot pressure on the platform 220. In other words, there is resistance to pivotal movement of the platform 220. Tactile feedback allows the operator to have a better "touch and feel" and better sense of control over movement of the platform 220 and thus operation of the trolling motor 110. In a preferred embodiment, the tactile feedback is resistance of the platform 220 to pivotal movement. However other forms of tactile feedback may be used such as, for example, shaking of the platform 220 if the support column 132, drive motor 134, and propeller 136 are being rotated too sharply.

Figure 3:
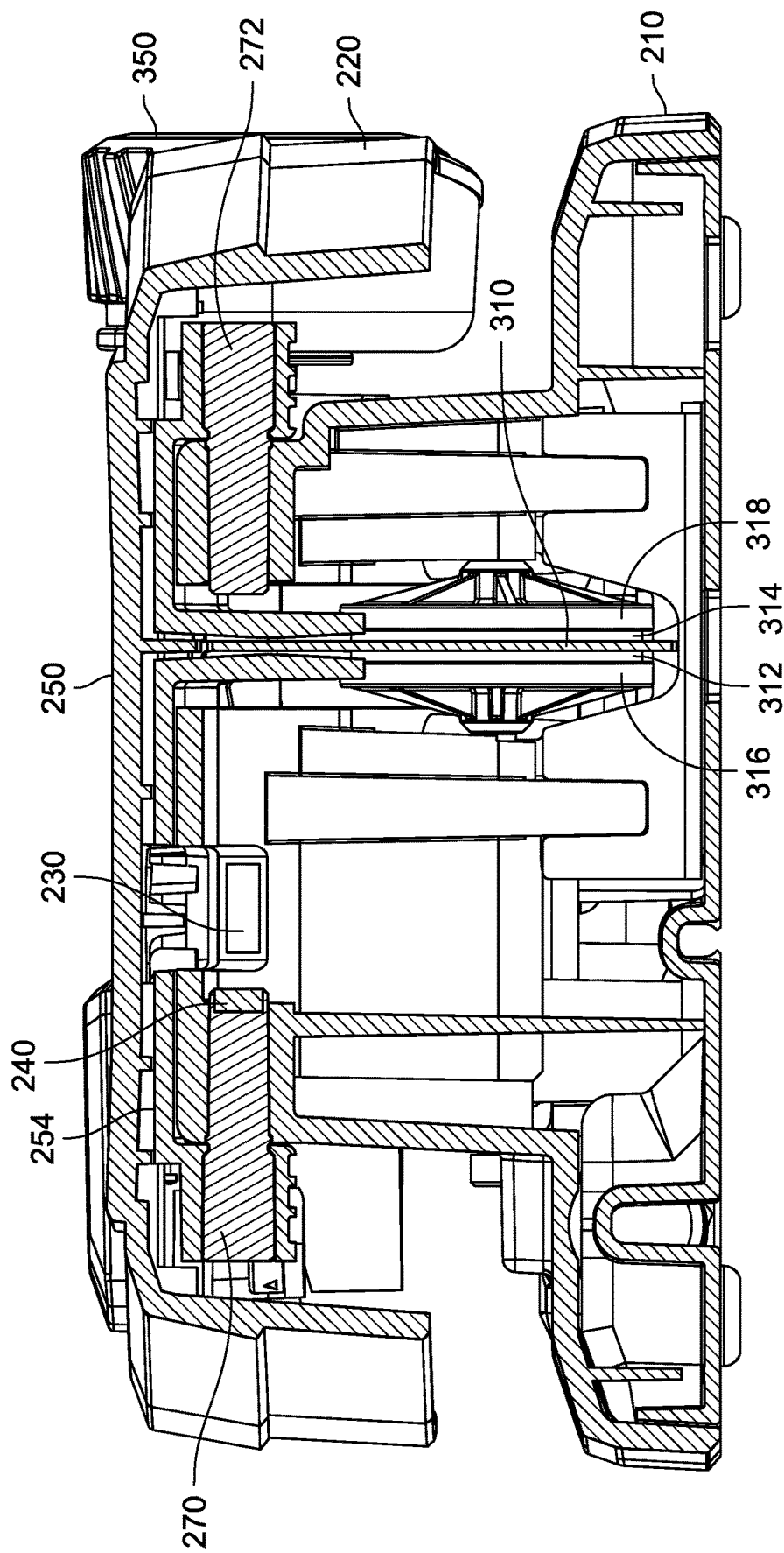
FIG. 3 is a cross-sectional view along section line 3-3 of FIG. 5 of a foot pedal device for controlling a trolling motor of a marine vessel and navigating the vessel, in accordance with an example embodiment of the present disclosure.
Figure 4:
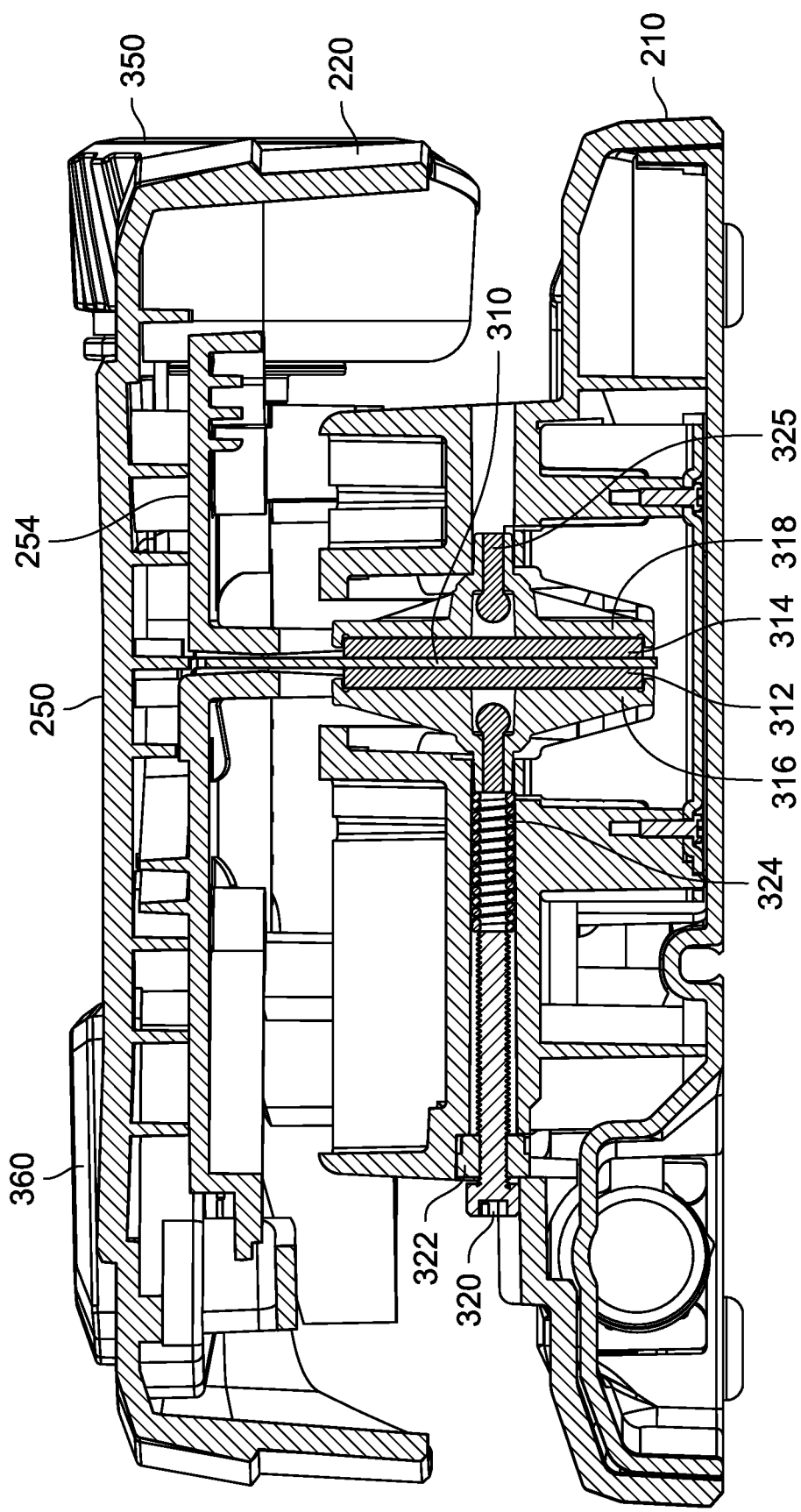
FIG. 4 is a cross-sectional view along section line 4-4 of FIG. 5 of a foot pedal device for controlling a trolling motor of a marine vessel and navigating the vessel, in accordance with an example embodiment of the present disclosure.
Figure 5:
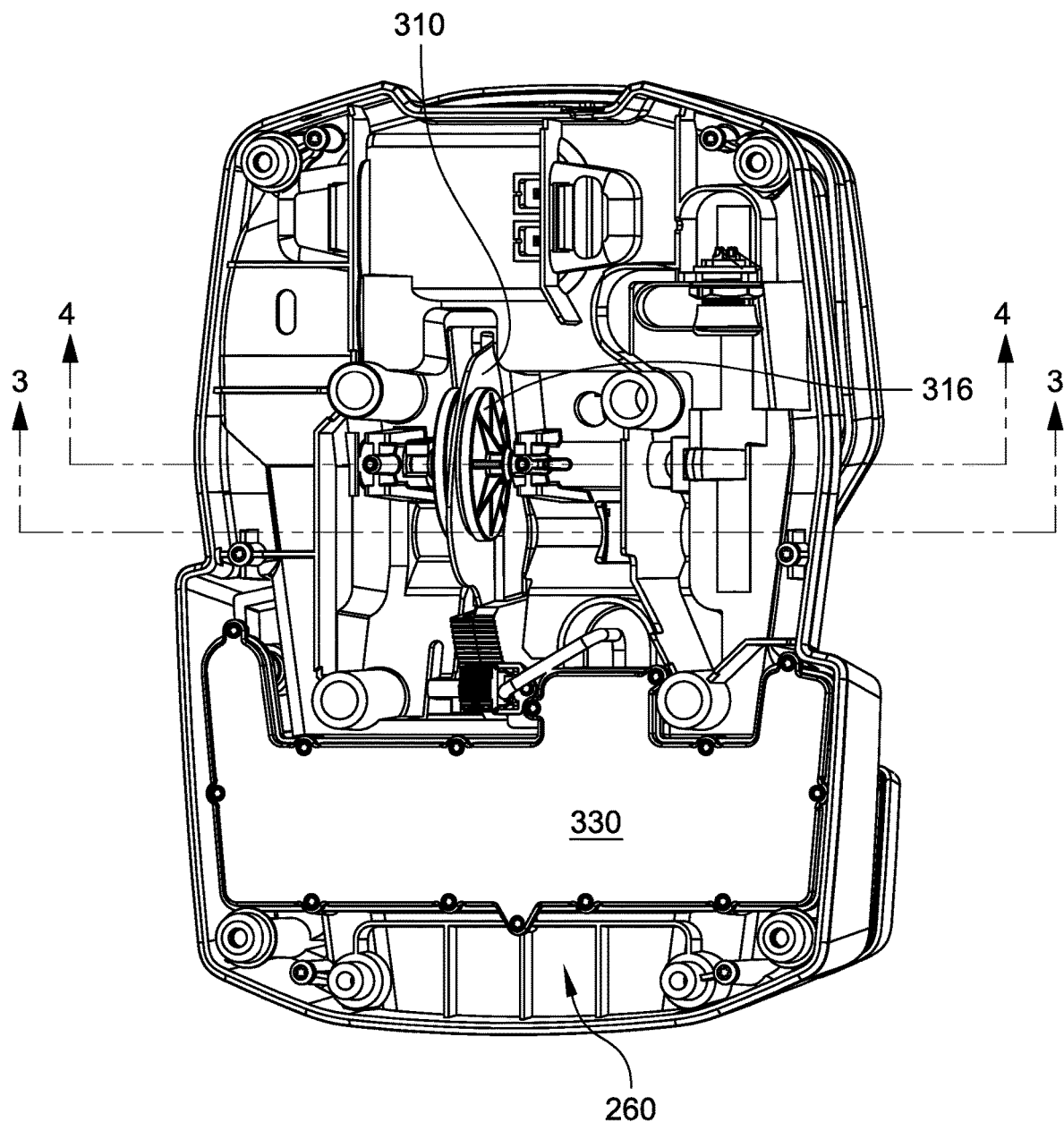
FIG. 5 is a bottom view of a foot pedal device for controlling a trolling motor of a marine vessel and navigating the vessel, in accordance with an example embodiment of the present disclosure.

One implementation of providing tactile feedback is illustrated in FIGS. 3 through 5. As described above, the platform 220 pivots axially upon the base 210. The platform 220 includes an outer frame 250 and an inner frame 254. A brake plate 310 is affixed vertically to the inner frame 254 so that it moves with the platform 220 as the platform 220 is pivoted on the base 210. A pair of friction pads 312, 314 are affixed to the base 210, held by friction pad holders 316, 318, respectively. The friction pads 312, 314 contact and apply pressure on either side of the brake plate 310, thus causing resistance to pivotal movement of the brake plate 310 and the platform 220.

A brake friction adjustment screw 320 adjusts the amount of pressure the pads 312, 314 exert on the brake plate 310 and the degree of tactile feedback for the operator when pressing on the platform 220. In one implementation, a brake friction adjustment screw 320, threaded through nut 322, compresses or releases spring 324 which controls the pressure of ball ended post 325 against friction pad holder 316. Adjustment of screw 320 thus manually controls the amount of pressure applied to the brake plate 310.

The brake plate 310 is shown as a flat elongated plate and it may have a variety of configurations so long as it provides a surface against which the pads 312, 314 can apply pressure. The brake plate 310 can be stainless steel or another appropriate material. The Figures illustrate one particular method of creating resistance to pivotal movement of the platform 220 but a number of methods can be employed. Other tactile feedback devices can be implemented including mechanical feedback devices as described above, or electrical/electronic based feedback devices. For example, in an embodiment, the tactile feedback can be controlled by a controller such as the controller 260. A signal generated by movement of the platform 220 is sent to controller 260 which returns a signal causing resistance to movement of platform 220. This resistance can be provided by the brake pads 312, 314 and brake plate 310 or by another mechanism. For example, movement of brake pads 312, 314 against the brake plate 310 can be activated by electronic means rather than the adjustment screw 320.

In an embodiment, the platform 220 is configured to stay in the position in which it was placed by the operator even though the operator removes his/her foot from the foot pedal device 200. Brake friction adjustment screw 320 can be adjusted to allow this position lock by pressure of the pads 312, 314 against the brake plate 310. Since the platform 220 does not revert to a neutral position, the vessel 100 can remain in the turning angle initiated by the platform position until the operator places his foot on the platform 220 again or the trolling motor 110 is controlled by another method.

Controller 260 can be programmed so that foot pedal device 200 enables up to five hundred forty degrees (540°) of rotation of the drive motor 134 and propeller 136 so that the vessel is able to turn a full three hundred sixty degrees (360°) even if it is moving backwards. This is possible because there are no cables prohibiting rotation of the support column 132, drive motor 134, and propeller 136. As discussed above, rotation of the trolling motor 110 support column 132, drive motor 134, and propeller 136 does not necessarily translate into corresponding turning of the vessel if the vessel is subject to other forces such as a current or wind, for example.

Figure 2:
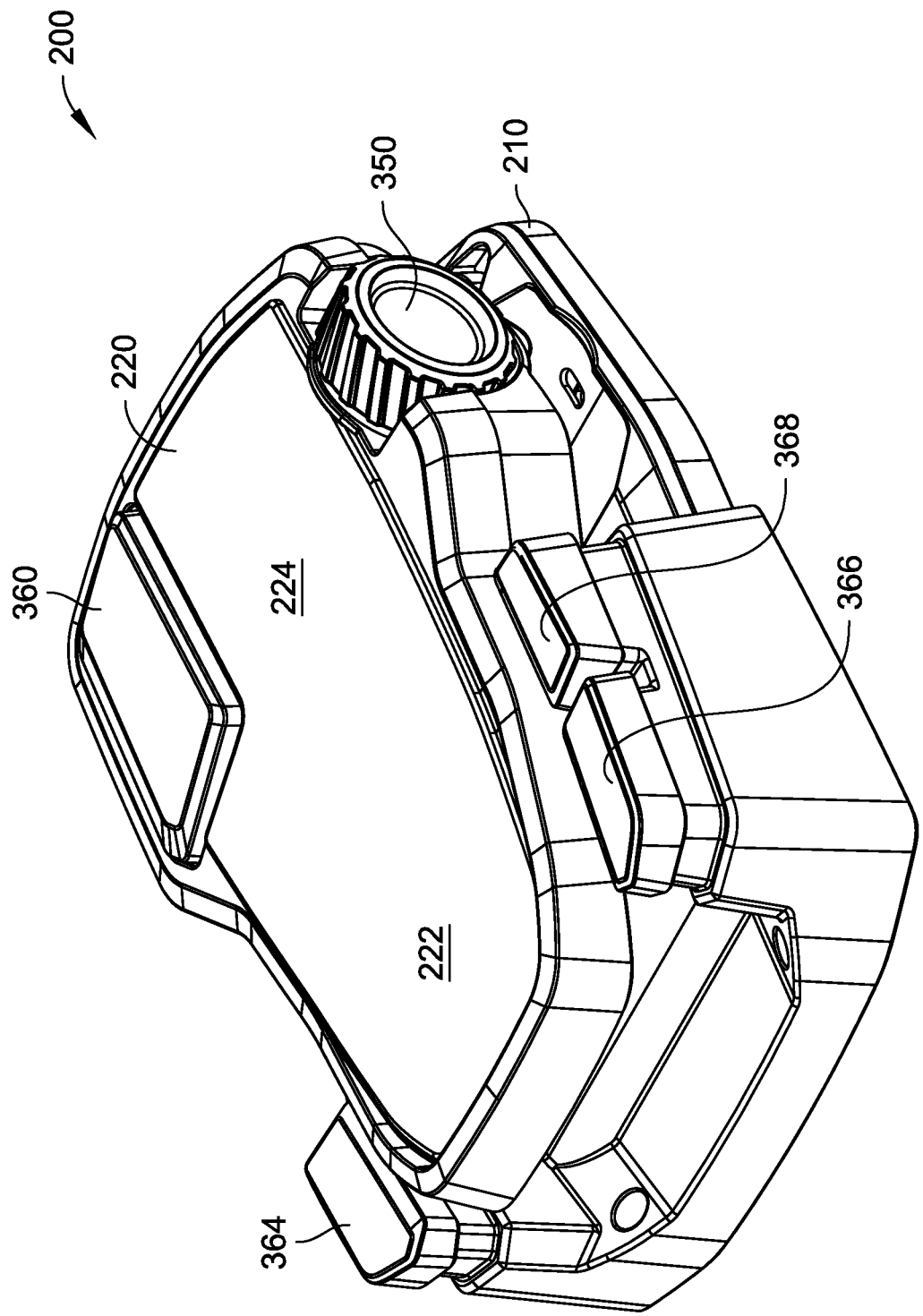
FIG. 2 is an isometric view of a foot pedal device for controlling a trolling motor of a marine vessel and navigating the vessel, in accordance with an example embodiment of the present disclosure.

Other optional aspects of foot pedal device 200 are illustrated best in FIG. 2. The foot pedal device 200 may include an additional control for controlling the speed of the trolling motor 110 (i.e., rotational speed of the propeller 136). For example, as shown, the foot pedal device may include a speed control knob 350 that is mounted on the foot pedal device 200 to the side of platform 220 where it can be easily accessed and operated by the toe of the operator's foot. The speed control knob 350 furnishes input to the controller 260 or via another controller. Generally, an operator rotates the speed control knob 350 clockwise causing the knob 350 to transmit a signal to a controller, such as controller 260, and to the electric steer control 130 of the trolling motor 110 to increase the speed of the trolling motor 110. This may translate to increased speed of the vessel, depending on forces acting on the vessel such as the current and wind, for example. Similarly, an operator rotates the speed control knob 350 counterclockwise causing the knob 350 to transmit a signal to a controller, such as controller 260, and to the electric steer control 130 of the trolling motor 110 to decrease the speed of the trolling motor 110, and possibly decrease the speed of the vessel 100.

As further shown in FIG. 2, the foot pedal device 200 may also include an acceleration control (i.e., acceleration button 360). In the embodiment illustrated, the acceleration button 360 is located on the platform 220 in the toe portion 224 of the platform 220. The acceleration button 360 can be included on the device 200 to provide a foot activated method of accelerating the trolling motor 110 and possibly the vessel 100. For example, pressing button 360 can send a signal to controller 260, or another controller, to cause electric steer control 130 of trolling motor 110 to turn on or off or to accelerate or decelerate if the trolling motor is already running Button 360 can be a simple on/off switch or can have various levels of control. For example, controller 260 can be configured so that button 360 is pressed once to activate trolling motor 110, the speed of which is then controlled by speed knob 350. Pressing button 360 again can cause trolling motor 110 to turn off. Button 360 can be configured to provide a temporary or permanent speed burst.

Speed control knob 350 and acceleration button 360 can be configured in various ways and can operate in various manners based upon how controller 260, or another controller, are configured.

In embodiments, such as that shown in FIG. 2, the foot pedal 200 may include additional user input buttons 364, 366, 368, which may be mounted on the base 210 of the foot pedal 200. These user input buttons can be used to control various functions of the electric steer control 130 of the trolling motor 110, as directed by controller 260 or another controller. For example, user input button 366 can be configured to drop anchor. By depressing this button 366 with his or her foot, the operator can cause the controller 260 to direct the trolling motor 110 to anchor the marine vessel 100 in its present position, or, alternately, a future position. The electric steer control 130 can adjust for the current, wind, and other factors to maintain the desired position. Similarly, the user input button 364 can be configured as a hold course control. By depressing this button 364 the operator may cause the controller 260 to direct the trolling motor 110 to continue the present heading of the marine vessel 100. Again, the electric steer control 130 can adjust for the current, wind, and other factors to maintain the desired heading. The user input button 368 can be configured to provide cruise control. The operator, by depressing this button 368, can cause the controller 260 to direct the trolling motor 110 to maintain the present speed of vessel 100, again adjusting for the current, wind, and other factors. One or more of the user input buttons 364, 366, 368 can include an indicator light or an indicator light can be provided separately on the foot pedal device 200. Other optional functions are jog left or jog right.

While these additional optional controls are illustrated mounted to the base 210 in a particular configuration, they can be mounted in a different configuration and can be controls other than buttons, for example levers or toggle switches. There can be greater or fewer controls than shown in the Figures. The above mentioned actions of the trolling motor 110 that are furnished by controls on the foot pedal device 200 can be dictated by controller 260 or another controller on foot pedal device 200 or another controller external to the foot pedal device 200.

FIG. 5 provides another view of the tactile feedback system including the brake pads 312, 314, friction pads 316, 318, and the brake plate 310. The housing 330 can house controller 260 and other components and can be waterproof. One or more wiring harnesses (not shown) can be employed as needed to connect the controller 260 to parts such as sensor 230, speed control knob 350, acceleration button 360, and user input buttons 364, 366, 368.

Figure 6:
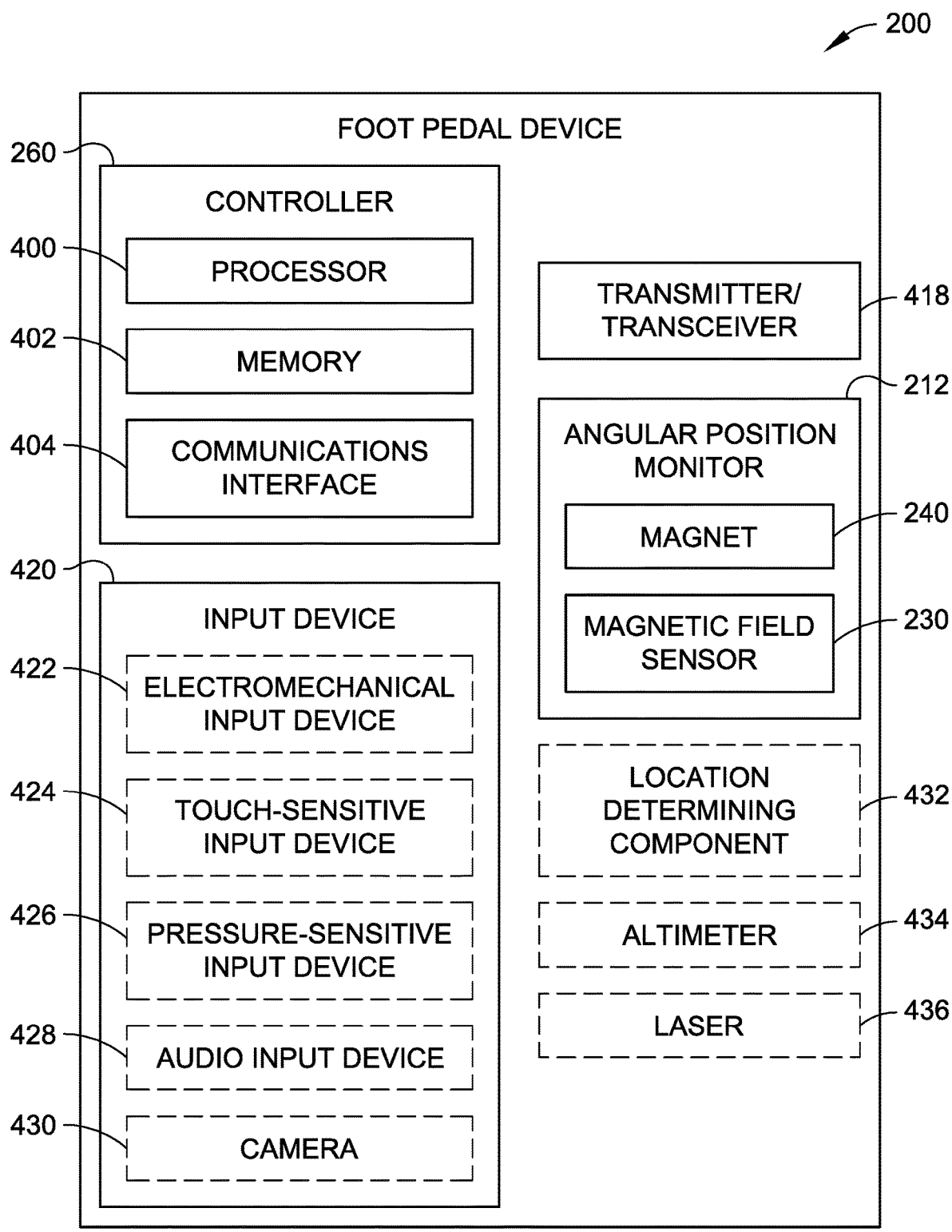
FIG. 6 is a block diagram illustrating components of a foot pedal device for controlling a trolling motor and navigating a marine vessel, in accordance with an example embodiment of the present disclosure.

The controller 260 can be communicatively coupled with some or all the components of the foot pedal device 200. For example, the controller 260 can be communicatively coupled to the magnetic field sensor 230, speed control knob 350, acceleration button 360, and user input buttons 364, 366, 368. As shown in FIG. 6, the controller 260 includes a processor 400 to control the components and functions of the foot pedal device 200 described herein. The processor 400 may use software, firmware, hardware (e.g., fixed logic circuitry), or a combination thereof. The terms "controller," "functionality," "service," and "logic" as used herein generally represent software, firmware, hardware, or a combination of software, firmware, or hardware in conjunction with controlling the foot pedal device 200. As shown in FIG. 6, the controller 260 can also include a memory 402 and a communications interface 404.

The processor 400 provides processing functionality for at least the controller 260 and can include any number of processors, micro-controllers, circuitry, field programmable gate array (FPGA) or other processing systems, and resident or external memory for storing data, executable code, and other information accessed or generated by the controller 260. The processor 400 can execute one or more software programs embodied in a non-transitory computer readable medium that implement techniques described herein. The processor 400 is not limited by the materials from which it is formed, or the processing mechanisms employed therein and, as such, can be implemented via semiconductor(s) and/or transistors (e.g., using electronic integrated circuit (IC) components), and so forth.

The controller may further include memory 402, The memory 402 can be a tangible, computer-readable storage medium that provides storage functionality to store various data and or program code associated with operation of the controller 260, such as software programs and/or code segments, or other data to instruct the processor 400, and possibly other components of the foot pedal device 200/ controller 260, to perform the functionality described herein.

The memory 402 can store data, such as a program of instructions for operating the foot pedal device 200 (including its components), and so forth. It should be noted that while a single memory 402 is described, a wide variety of types and combinations of memory (e.g., tangible, non-transitory memory) can be employed. The memory 402 can be integral with the processor 400, can comprise stand-alone memory, or can be a combination of both. Some examples of the memory 402 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In embodiments, the foot pedal device 200 and/or the memory 402 can include removable integrated circuit card (ICC) memory, such as memory provided by a subscriber identity module (SIM) card, a universal subscriber identity module (USIM) card, a universal integrated circuit card (UICC), and so on.

A communications interface 404 can be operatively configured to communicate with components of the foot pedal device 200. For example, the communications interface 404 can be configured to transmit data for storage in the foot pedal device 200, retrieve data from storage in the foot pedal device 200, and so forth. The communications interface 404 can also be communicatively coupled with the processor 400 to facilitate data transfer between components of the foot pedal device 200 and the processor 400 (e.g., for communicating inputs to the processor 400 received from a device communicatively coupled with the controller 260, including, but not limited to, data received from the magnetic field sensor 230, and/or any other component of the foot pedal device 200). It should be noted that while the communications interface 404 is described as a component of controller 260, one or more components of the communications interface 404 can be implemented as components of the foot pedal device 200 or components communicatively coupled to the foot pedal device 200 via a wired and/or wireless connection. For example, the foot pedal device 200 and/or the controller 260 can include a transmitter/transceiver 418 (or in some embodiments, a transmitter and a receiver) for sending communications (e.g., control signals, directional and/or orientation measurements, etc.) to at least one trolling motor 110. For example, the transmitter/transceiver 418 can be a wireless transmitter or a wireless transceiver that wirelessly communicates with at least one trolling motor 110.

The foot pedal device 200 can also include and/or can connect to one or more input/output (I/O) devices (e.g., via the communications interface 404), such as a display, a mouse, a touchpad, a touchscreen, a keyboard, a microphone (e.g., for voice commands) and so on. In embodiments, the foot pedal device 200 includes at least one input device 420 configured to receive user inputs. For example, the input device 420 can include, but is not limited to, an electromechanical input device 422 (e.g., a button, switch, toggle, trackball, or the like), a touch-sensitive input device 424 (e.g., a touchpad, touch panel, trackpad, or the like), a pressure-sensitive input device 426 (e.g., a force sensor or force-sensitive touchpad, touch panel, trackpad, button, switch, toggle, trackball, or the like), an audio input device 428 (e.g., microphone), a camera 430, or a combination thereof. The foot pedal device 200 may also include at least one output device (e.g., a display, indicator light(s), speaker, mechanical feedback device, or the like) for communicating information to the user.

The foot pedal device 200 may also include one or more sensors that are used in conjunction with the angular position monitor (e.g., magnet 240 and magnetic field sensor 230). For example, the foot pedal device 200 may further include a location determining component 432 that is configured to determine a position of the foot pedal device 200 (e.g., geographic coordinates of the foot pedal device 200 and/or localized coordinates of the foot pedal device 200 relative to the marine vessel 100). In an embodiment, the location determining component 432 is a global navigation satellite system (GNSS) receiver (e.g., a global positioning system (GPS) receiver, software defined (e.g., multi-protocol) receiver, or the like). In some embodiments, the location determining component 432 is configured to localize the foot pedal device 200 relative to the marine vessel 100 (e.g., determining where the foot pedal device 200 is located on the marine vessel 100). For example, the location determining component 432 can be or can include a wireless receiver (e.g., Bluetooth, Zigbee, Wifi, or NFC receiver, or the like) that is configured to employ a triangulation algorithm to determine a position of the foot pedal device 200 relative to one or more fixed transmitters on the marine vessel 100. In some embodiments, the foot pedal device 200 includes an altimeter 434 for determining an elevation of the foot pedal device 200 above a surface of the water. As further described herein, in embodiments, the foot pedal device 200 may be configured to generate the control signals for the one or more trolling motors of the marine vessel 100 based on data (e.g., measurements) received from the magnet 240, the magnetic field sensor 230, location determining component 432, altimeter 434, or a combination thereof.

Figure 7:
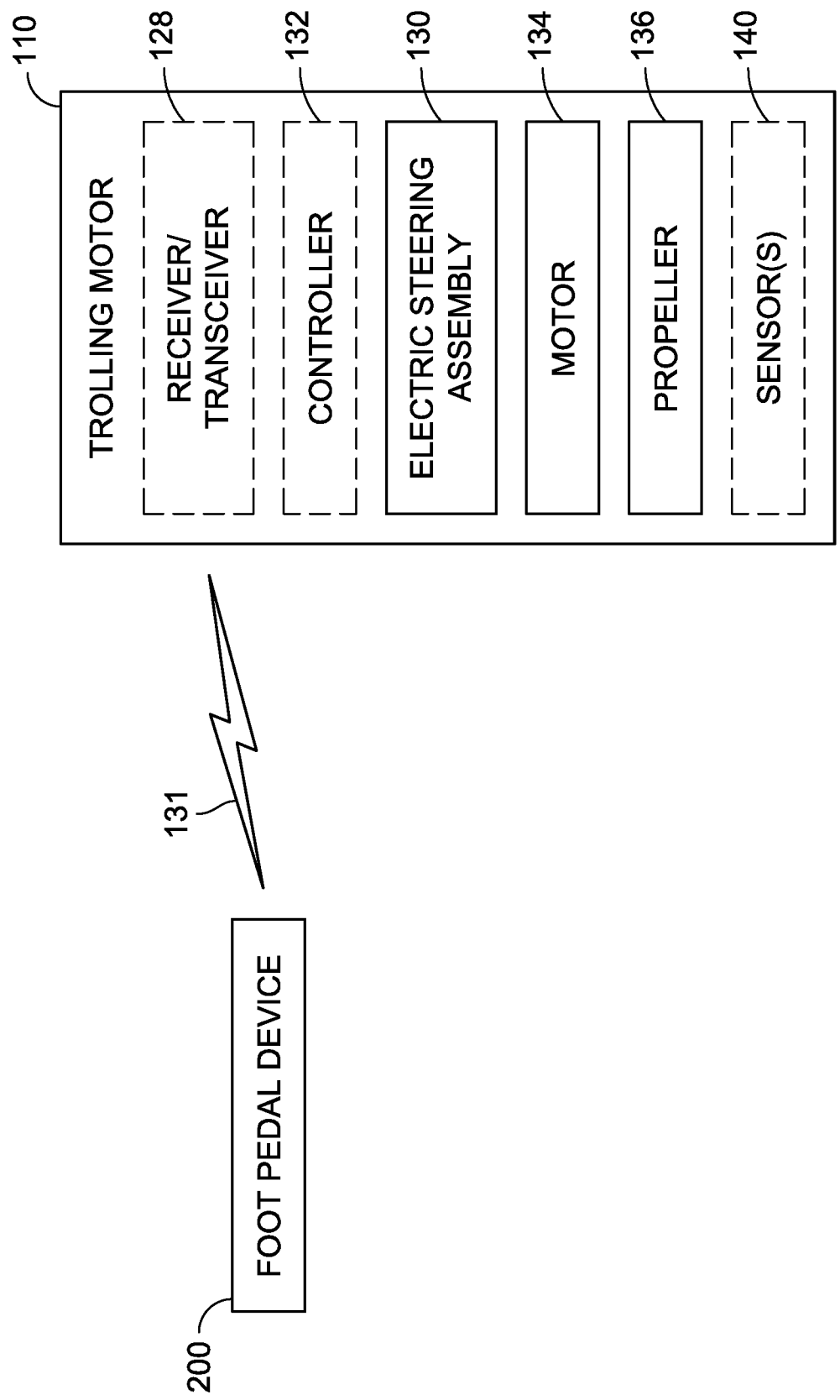
FIG. 7 is a block diagram illustrating components of a foot pedal device for controlling a trolling motor and navigating a marine vessel, in accordance with an example embodiment of the present disclosure.

As discussed above, in some embodiments, the foot pedal device 200 is configured to generate one or more control signals and/or configured to communicate data (e.g., measurements, user inputs, etc.) to a trolling motor 110. As shown in FIG. 7, the trolling motor 110 may include or may be coupled with a receiver/transceiver 128 (or in some embodiments, a receiver and a transmitter) configured to receive the control signals and/or other communications from the foot pedal device 200 via a communications link 131 (e.g., a wireless connection). The trolling motor 110 may also include or may be coupled with a controller 132, which may include components and/or circuitry as described above with regard to controller 260. The controller 132 can be configured to control a steering assembly (e.g., electric steer control 130) and/or an actuator 134 (e.g., motor 134) that drives the propeller 136 of the trolling motor 110. In embodiments, the controller 132 can be configured to turn, change the rotational direction of, and/or change the rotational speed of the propeller 136 by controlling the electric steer control 130 and/or motor 134 based on control signals received from the foot pedal device 200. In some embodiments, the controller 132 itself is configured to generate the control signals or a portion thereof based on communication data (e.g., measurements, user inputs, etc.) received from the foot pedal device 200. The trolling motor 110 may also include at least one sensor 140 (e.g., a speed sensor, magnetometer, inertial sensor, location determining component, a combination thereof, or the like), and the controller 132 can be configured to generate control signals at least partially based on sensory data collected by the one or more sensors 140 and/or can be configured to communicate the sensory data to the foot pedal device 200.

Figure 8:
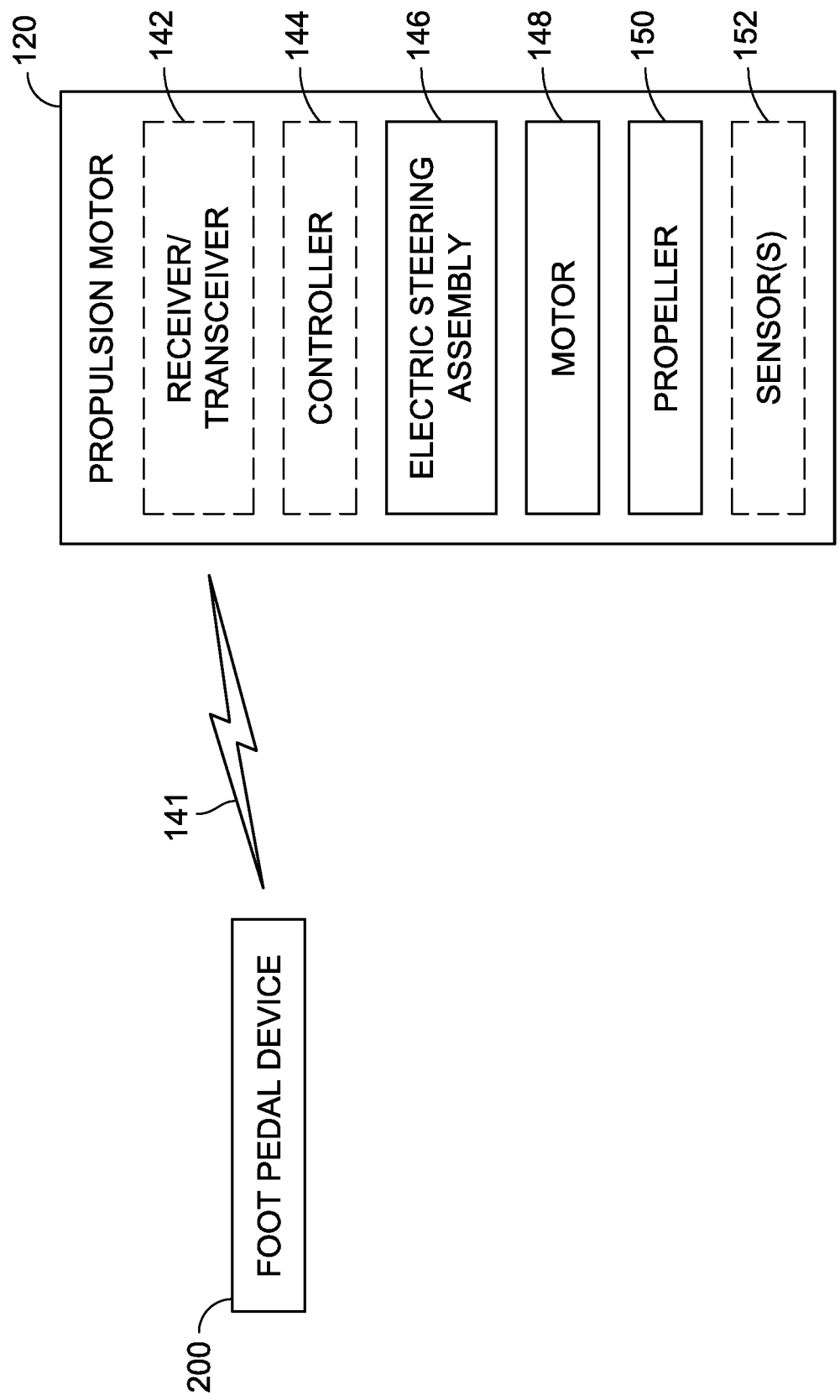
FIG. 8 is a block diagram illustrating components of a foot pedal device for controlling a propulsion motor and navigating a marine vessel, in accordance with an example embodiment of the present disclosure.

The foot pedal device 200 is described above configured to generate one or more control signals and/or configured to communicate data (e.g., measurements, user inputs, etc.) to a trolling motor 110. It may be useful to use the foot pedal device 200 to generate one or more control signals and/or communicate data (e.g., measurements, user inputs, etc.) to the propulsion motor 120. As shown in FIG. 8, the propulsion motor 120 may include or may be coupled with a receiver/transceiver 142 (or in some embodiments, a receiver and a transmitter) configured to receive the control signals and/or other communications from the foot pedal device 200 via a communications link 141 (e.g., a wired or wireless connection). The propulsion motor 120 may also include or may be coupled with a controller 144, which may include components and/or circuitry as described above with regard to controller 260. The controller 144 can be configured to control a steering assembly 146 (e.g., electromechanical steering assembly) and/or an actuator 148 (e.g., motor) that drives the propeller 150 of the propulsion motor 122. In embodiments, the controller 144 can be configured to turn, change the rotational direction of, and/or change the rotational speed of the propeller 150 by controlling the steering assembly 146 and/or actuator 148 based on control signals received from the foot pedal device 200. In some embodiments, the controller 144 itself is configured to generate the control signals or a portion thereof based on communication data (e.g., measurements, user inputs, etc.) received from the foot pedal device 200. The propulsion motor 122 may also include one or more sensors 152 (e.g., a speed sensor, magnetometer, inertial sensor, location determining component, a combination thereof, or the like), and the controller 144 can be configured to generate control signals at least partially based on sensory data collected by the one or more sensors 152 and/or can be configured to communicate the sensory data to the foot pedal device 200.

Figure 9:
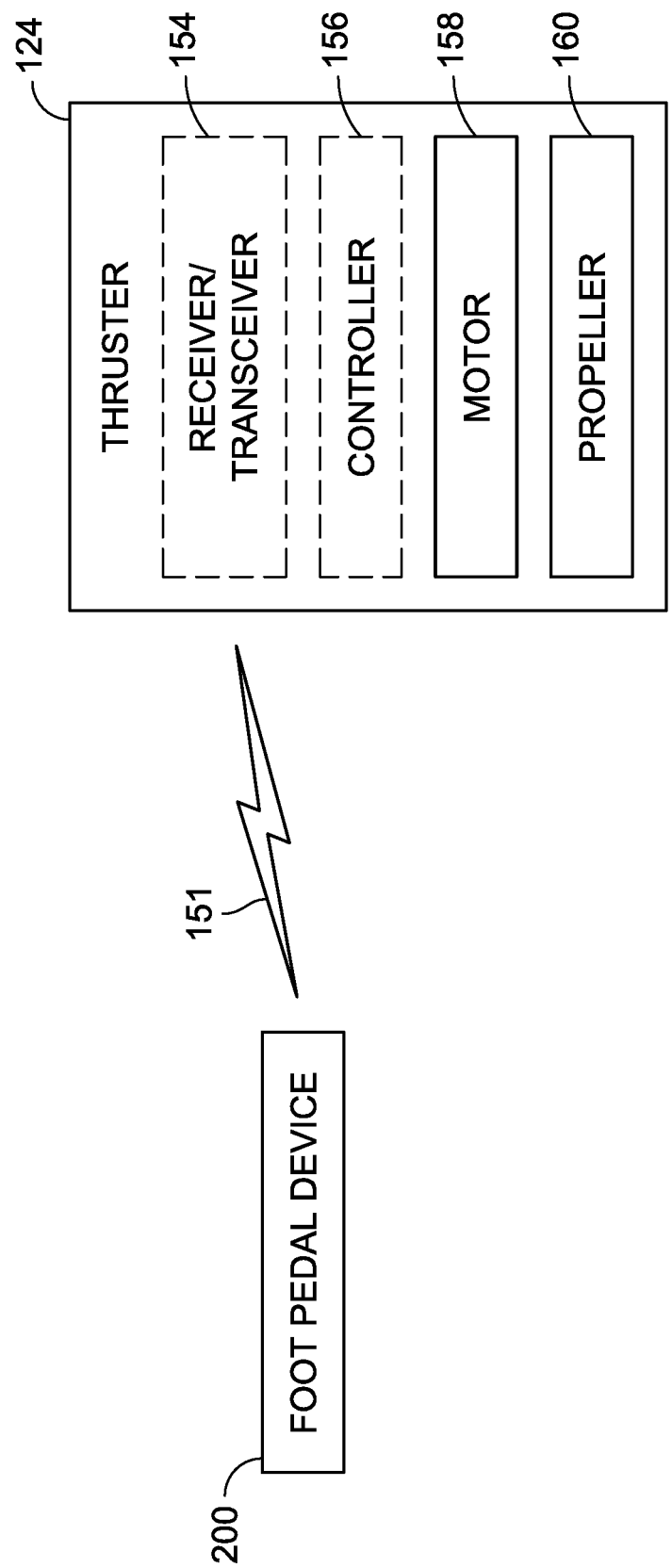
FIG. 9 is a block diagram illustrating components of a foot pedal device for controlling a thruster and navigating a marine vessel, in accordance with an example embodiment of the present disclosure.

In some embodiments, the handheld device 200 is configured to generate one or more control signals and/or configured to communication data (e.g., measurements, user inputs, etc.) to a thruster 124. As shown in FIG. 9, the thruster 124 may include or may be coupled with a receiver/transceiver 154 (or in some embodiments, a receiver and a transmitter) configured to receive the control signals and/or other communications from the handheld device 200 via a communications link 151 (e.g., a wired or wireless connection). The thruster 124 may also include or may be coupled with a controller 156, which may include components and/or circuitry as described above with regard to controller 260. The controller 156 can be configured to control an actuator 148 (e.g., motor) that drives the propeller 160 of the thruster 124. In embodiments, the controller 156 can be configured to change the rotational direction of and/or change the rotational speed of the propeller 160 by controlling the actuator 158 based on control signals received from the foot pedal device 200. In some embodiments, the controller 156 itself is configured to generate the control signals or a portion thereof based on communication data (e.g., measurements, user inputs, etc.) received from the foot pedal device 200.

Figure 10:
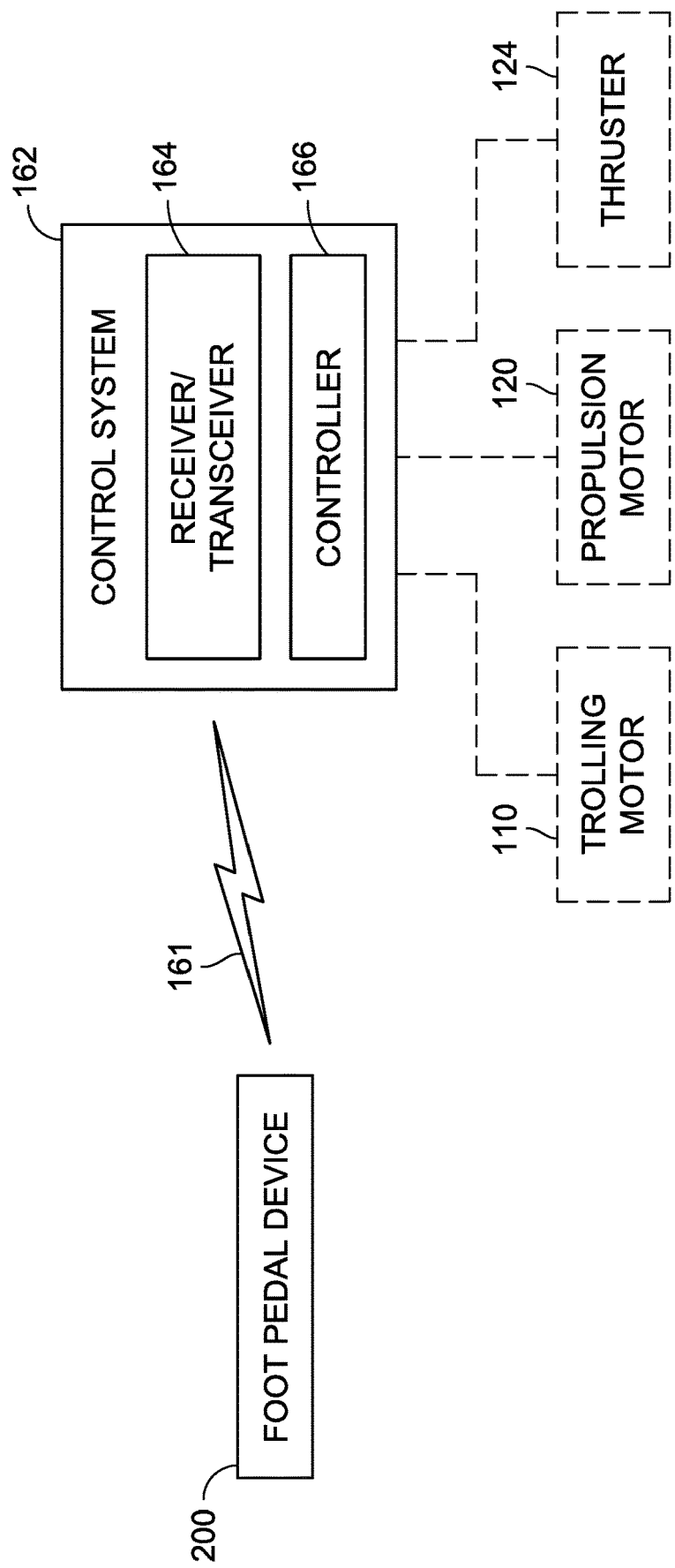
FIG. 10 is a block diagram illustrating a control system in communication with a foot pedal device for navigating a marine vessel, wherein the control system is configured to control at least one motor (e.g., at least one trolling motor, propulsion motor, and/or thruster) based on communications from the foot pedal device, in accordance with an example embodiment of the present disclosure.

The foot pedal device 200 can be communicatively coupled to the trolling motor 110, propulsion motor 120, or thruster 124 as described above, or to any combination of motors on the marine vessel 100. In embodiments, the foot pedal device 200 can be communicatively coupled to the trolling motor 110 and the propulsion motor 120, the trolling motor 110 and the thruster 124, the propulsion motor 120 and the thruster 124, or the trolling motor 110, the propulsion motor 120, and the thruster 124. In some embodiments, such as the embodiments shown in FIGS. 7 through 9, the foot pedal device 200 is communicatively coupled to one or more marine vessel 100 motors (e.g., trolling motor(s) 110, propulsion motor(s) 120, and/or thruster(s) 124) via at least one respective communications link (e.g., link 131, link 141, and/or link 151). In other embodiments, such as the embodiment shown in FIG. 10, the foot pedal device 200 is communicatively coupled to a control system 162 that is configured to control one or more marine vessel 100 motors (e.g., trolling motor(s) 110, propulsion motor(s) 120, and/or thruster(s) 124). For example, the control system 162 can include a receiver/transceiver 164 and a controller 166. The receiver/transceiver 164 (or in some embodiments, a receiver and a transmitter) is configured to receive the control signals and/or other communications from the foot pedal device 200 via a communications link 161 (e.g., a wired or wireless connection). The controller 166 is configured to control at least one of the motors (e.g., trolling motor 110, propulsion motor 120, and/or thruster 124) based on the control signals and/or other communications from the foot pedal device 200. In some embodiments, the controller 166 is configured to perform some or all the functions/operations described above with regard to controller 260, 132, controller 144, and/or controller 156. For example, the controller 166 may be configured to control at least one steering assembly (e.g., steering assembly 130 and/or steering assembly 146) and/or at least one motor/actuator (e.g., actuator 134, actuator 148, and/or actuator 158) based on the control signals and/or other communications received from the foot pedal device 200.

Figure 11:
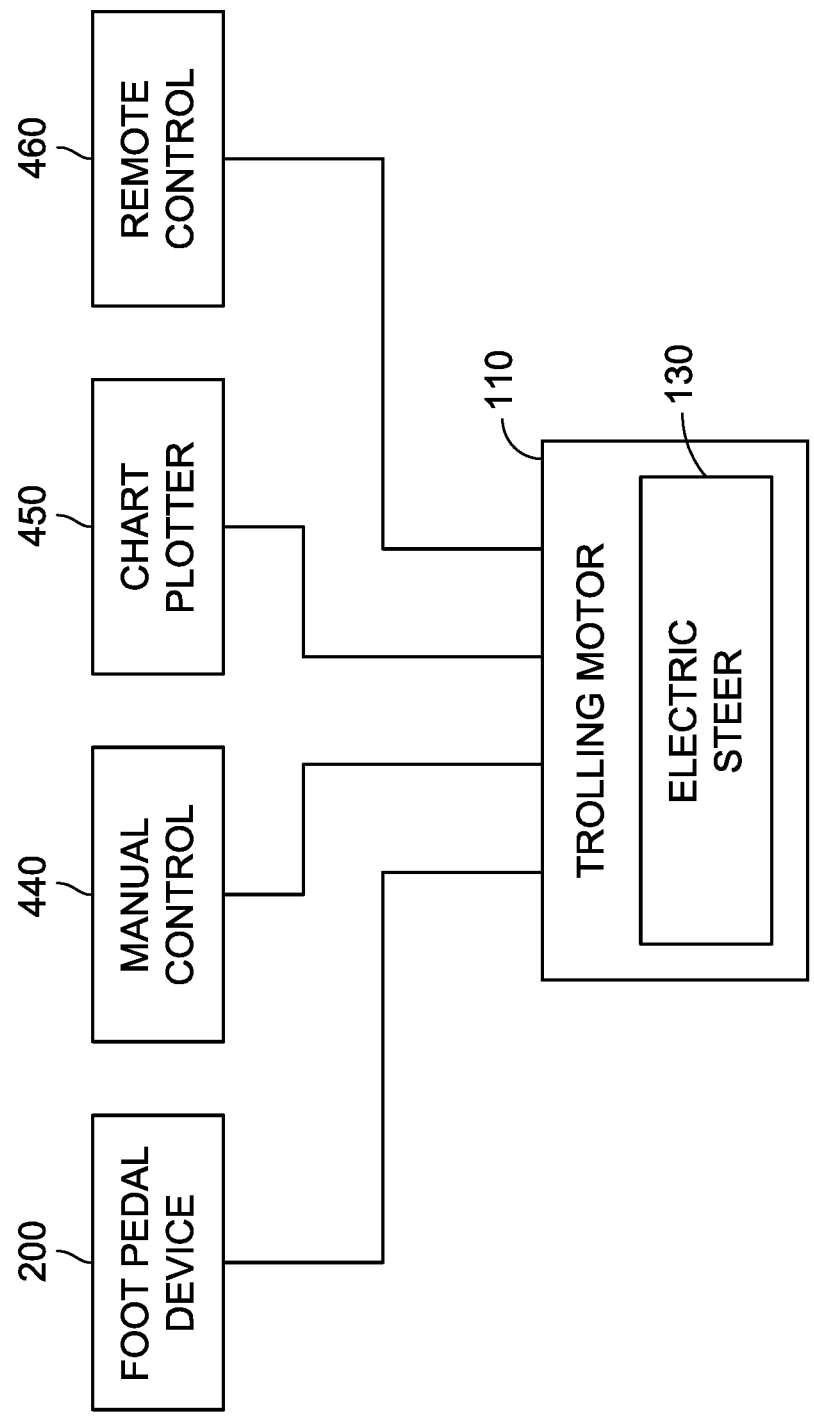
FIG. 11 is a block diagram illustrating a foot pedal device for controlling a trolling motor and navigating a marine vessel, in parallel or sequence with control of the motor by one or more of other control devices such as manual control, a chart plotter, or remote control, in accordance with an example embodiment of the present disclosure.

The foot pedal device 200 can be one component of a system controlling movement of vessel 100. As described above, the foot pedal device 200 can be configured to control various aspects of electric steer control 130 of trolling motor 110. As shown in FIG. 11, electric steer control 130 and trolling motor 110 can also be controlled by manual controls 440, chart plotter 450, and/or remote control 460, such as a hand held remote control. Each of the control methods can operate independently or can operate according to a hierarchy. The system can be designed so that any one method takes precedence over any other method, or that the last used method overrides prior method. For example, the system can be designed so that use of the foot pedal device 200 can take precedence over use of a chart plotter 450. In another implementation, the system can be designed so that use of manual control 440 can override any other method being used. Any one of the four methods, or other methods, can take precedence, or the system can be designed so that the last used method takes precedence. For example, an operator can use the chart plotter 450 to control the trolling motor 110, then use the manual control 440 which will override the chart plotter 450. Then the operator can use the remote control 460 to override use of the manual control 440, and then use the foot pedal device 200, which can override the remote control 460.

Figure 12:
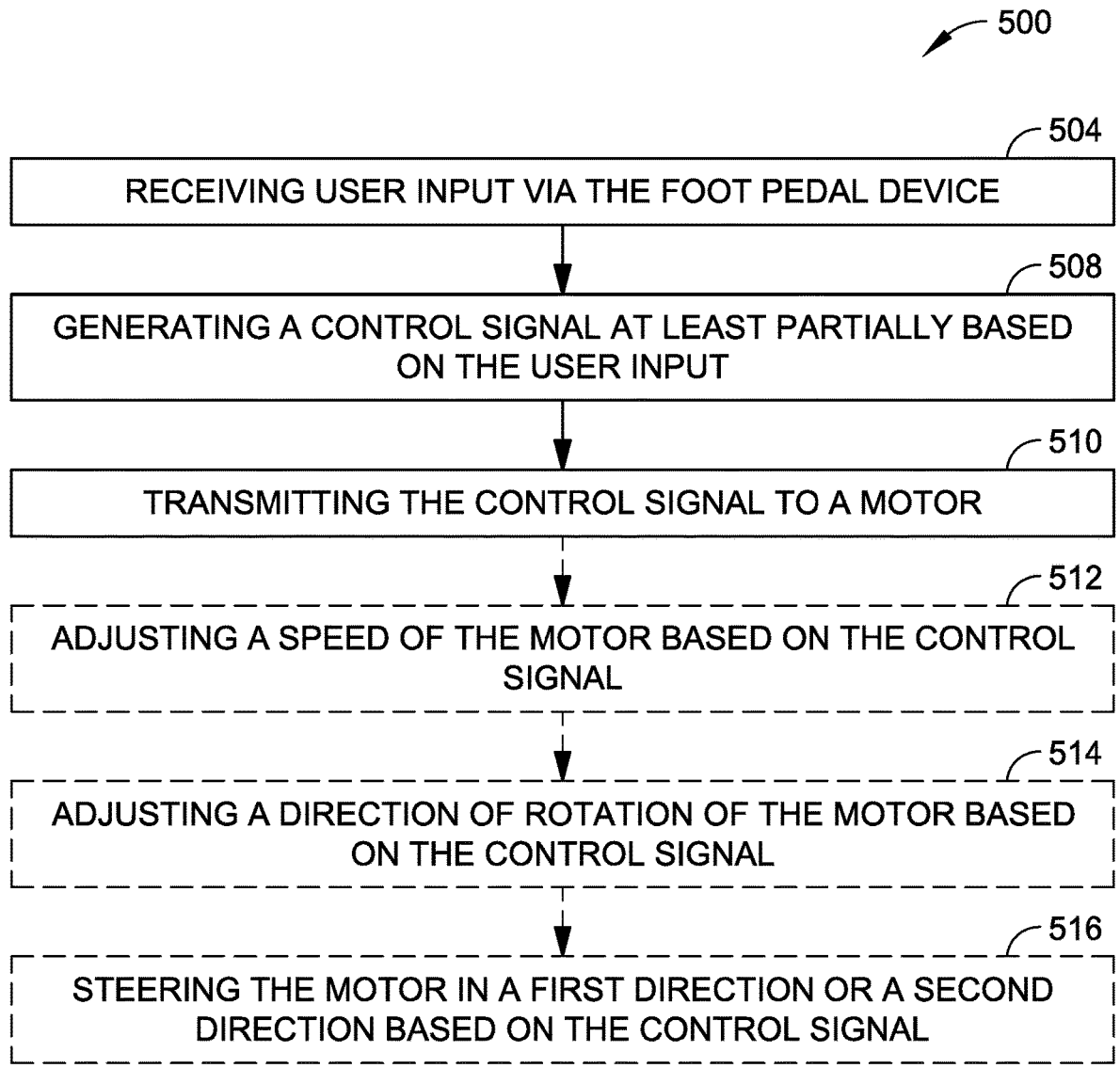
FIG. 12 is a flow diagram illustrating a process for navigating a marine vessel by employing a foot pedal device to control at least one motor (e.g., at least one trolling motor, propulsion motor, and/or thruster) of the marine vessel, in accordance with an example implementation of the present disclosure.

FIG. 12 illustrates an example process 500 that employs a foot pedal device 200 for navigating a marine vessel (e.g., marine vessel 100) through the water. In general, operations of disclosed processes (e.g., process 500) may be performed in an arbitrary order, unless otherwise provided in the claims. The foot pedal device 200 can be communicatively coupled to at least one motor of a marine vessel. For example, in an implementation, the foot pedal device 200 is communicatively coupled to the trolling motor 110 of the marine vessel 100. The foot pedal device 200 may be directly coupled to the trolling motor 110 via a wired or wireless communication link (e.g., link 131). Alternatively, the foot pedal device 200 may be communicatively coupled to a control system 162 that controls the trolling motor 110, a propulsion motor such as propulsion motor 120, and/or thruster such as thruster 124 based on control signals and/or data received from the foot pedal device 200.

User input via the foot pedal device 200 is transmitted to the controller 260 (block 504) which generates a control signal (block 508) and transmits it to at least one motor (block 510). For example, the control signal is transmitted to the trolling motor 110, propulsion motor 120, and/or thruster 124 from the foot pedal device 200 or from the control system 162 and/or the respective controller of each motor in response to data received from the handheld device 200. A control signal may cause the control system 162 and/or the controller of at least one motor (e.g., trolling motor 110, propulsion motor 120, and/or thruster 124) to activate/deactivate or adjust a speed of the motor based on the control signal (block 512). A control signal may cause the control system 162 and/or the controller of at least one motor (e.g., trolling motor 110, propulsion motor 120, and/or thruster 124) to adjust (e.g., set or change) the direction of rotation of the motor based on the control signal (block 514). A control signal may cause the control system 162 and/or the controller of at least one motor (e.g., trolling motor 110, propulsion motor 120, and/or thruster 124) to steer the motor (e.g., turn the motor in a first direction or a second direction) based on the control signal (block 516). In implementations, one motor or multiple motors (e.g., trolling motor 110, propulsion motor 120, and/or thruster 124) of the marine vessel 100 are controlled by adjusting one or more operating parameters (e.g., direction of rotation, speed, and heading) based on control signals generated according to user inputs from the foot pedal device 200.

The above-described aspects are only examples of aspects that may be implemented by the foot pedal device. Other modes of operation, or combinations or portions of the above-described modes, may also be implemented without departing from the scope of the invention. While a foot pedal device for controlling a trolling motor is primarily described herein, it is contemplated that a wide variety of other controllers may also be used, and for control of vehicles other than boats.

Although the technology has been described with reference to the embodiments illustrated in the attached drawing figures, equivalents may be employed, and substitutions made herein without departing from the scope of the technology as recited in the claims. Components illustrated and described herein are merely examples of a device and components that may be used to implement the embodiments of the present invention and may be replaced with other devices and components without departing from the scope of the invention.

What is claimed is:

1. A foot pedal device for controlling a trolling motor having an electric steer control comprising:
   a base member;
   a foot pedal platform configured to pivotally rotate upon the base;
   a mechanism for tactile feedback to platform pivotal rotation;
   an angular position monitor configured to detect pivotal movement of the foot pedal platform and generate a user input; and
   a controller communicatively coupled to the angular position monitor, the controller configured to generate a control signal at least partially based on the user input and to generate a feedback signal based on the user input to set a resistance associated with the mechanism for tactile feedback;

the control signal configured to control an operation of the electric steer control of the trolling motor;

wherein the operation of the electric steer control is proportional to the pivotal movement of the foot pedal platform.

2. The foot pedal device of claim 1, further comprising a transmitter communicatively coupled to the controller, the controller configured to transmit the at least one control signal to the electric steer control via the transmitter.

3. The foot pedal device of claim 2, wherein the transmitter comprises at least one of a wireless transmitter or a wireless transceiver.

4. The foot pedal device of claim 1, wherein the control signal comprises at least one of: a control signal to adjust the speed of the trolling motor; a control signal to adjust a direction of rotation of the trolling motor; a control signal to adjust a degree of rotation of the trolling motor, or a control signal to steer the trolling motor in a first direction or a second direction.

5. The foot pedal device of claim 1, wherein the foot pedal platform pivots on an axis and the angular position monitor includes a diametrically polarized magnet positioned at the axis and a magnetic field sensor positioned to detect movement of the diametrically polarized magnet.

6. The foot pedal device of claim 5, wherein the user input is an angle of axial pivot by the diametrically polarized magnet and the control signal is to adjust a direction and degree of rotation of the trolling motor, and wherein the controller is configured so that the angle of axial pivot is proportional to the direction and degree of rotation of the trolling motor.

7. The foot pedal device of claim 6, wherein the controller is configured to select between linear proportionality and exponential proportionality for operation of the electric steer control.

8. The foot pedal device of claim 1, wherein tactile feedback is provided using a brake plate and one or more friction pads, wherein the brake plate is attached to and pivots with the foot pedal platform and the one or more friction pads provide resistance to brake plate movement.

9. The foot pedal device of claim 1, further comprising controls to adjust the following parameters of the vessel: acceleration, deceleration, or speed.

10. The foot pedal device of claim 1, further comprising controls to control the following actions of the trolling motor: speed burst, drop anchor, hold course, cruise control, jog left, or jog right.

11. A system for navigating a marine vessel, the system comprising:

at least one trolling motor; and
a foot pedal device in communication with the at least one trolling motor, the foot pedal device including:
a base member;
a foot pedal platform pivotally attached to the base;
a mechanism for tactile feedback to platform pivotal rotation;
an angular position monitor that detects pivotal movement of the foot pedal platform and generates a user input; and
a controller communicatively coupled to the angular position monitor, the controller configured to receive the user input generate a control signal at least partially based on the user input and generate a control signal to control an operation of the electric steer control of the trolling motor wherein the pivotal movement is proportional to the operation,
wherein the controller is further configured to generate a feedback signal based on the user input to set a resistance associated with the mechanism for tactile feedback.

12. The system of claim 11, wherein the control signal comprises at least one of: a control signal to adjust the speed of the trolling motor; a control signal to adjust a direction of rotation of the trolling motor; a control signal to adjust a degree of rotation of the trolling motor, or a control signal to steer the trolling motor in a first direction or a second direction.

13. The system of claim 11, wherein the foot pedal platform pivots on an axis and the angular position monitor includes a diametrically polarized magnet positioned at the axis and a magnetic field sensor positioned to detect movement of the diametrically polarized magnet.

14. The system of claim 13, wherein the user input is an angle of axial pivot by the diametrically polarized magnet and the control signal is to adjust a direction and degree of rotation of the trolling motor, and the controller is configured so that the angle is proportional to the direction and degree of rotation.

15. The system of claim 11, wherein the controller is configured to select between linear proportionality and exponential proportionality for operation of the electric steer control.

16. The system of claim 11, further comprising a transmitter communicatively coupled to the controller, the controller configured to transmit the at least one control signal to the electric steer control via the transmitter.

* * * * *